Patented Aug. 17, 1954

2,686,771

UNITED STATES PATENT OFFICE 2,686,771

ACID-MODIFIED ETHER RESINS

Lynwood N. Whitehill and Robert S. Taylor, Chicago, Ill., assignors to The Sherwin-Williams Company, Cleveland, Ohio, a corporation of Ohio No Drawing. Application December 23, 1950, Serial No. 202,565

7 Claims. (Cl. 260—47)

This invention relates to a method of modifying the resin-forming reaction between a dihydric phenol and a difunctional halohydrin in alkaline media to alter the chemical and physical character thereof thereby to enhance the flexibility of the resinous product.

More particularly the invention is concerned with a process of manufacture of a class of resins wherein a phenolic component having at least two reactive hydroxy groups is condensed with a difunctional halohydrin to form a salt and an organic polymeric molecule containing a plurality of aromatic nuclei joined by means of ether linkages through a short chain aliphatic group containing free hydroxyl groups, the linear polymeric chains of which may or may not be terminated in epoxide-containing aliphatic groups, and the product resulting from the process, which we prefer to refer to as ether resins.

The general reaction of polymer formation is in itself old and has been previously described in the art.

The reaction may be carried out in various ways by adding a difunctional halohydrin to an alkaline syrup of a polyhydric phenol or by adding caustic to a mixture of such a halohydrin and polyhydric phenol, or various combinations of methods may be employed as, for instance, stepwise addition of one or more reactants to the remaining reactants. Advantageously, polymerization may be carried on in a solvent system (although this is not essential). Solvent technique facilitates the mechanics of carrying on the reaction. Methyl isobutyl ketone has been used as the solvent portion and gives good results.

While ether resins as described may be further modified by esterification to produce flexible films, the improvement herein described is concerned primarily with the initial unmodified condensation product which heretofore has required a baking temperature of 375 degrees F. and above in order to "cure out" and produce reasonably flexible films when used in enamel formulations in conjunction with amine-aldehyde resins. This temperature is approximately 75 degrees F. higher than the baking ovens used in the major appliance field and has prevented widespread adoption of the ether resins to coatings for this field of use. As the ether resins have many superior qualities which contribute durability to the finish of articles coated therewith adaptation of this class of coatings to the existent production lines of appliance manufactures is much to be desired.

It is a primary object of this invention to provide a method for the preparation of an ether resin of the unmodified class characterized by improved stability against gelation upon age when used in conjunction with aminoplast resins and which will when so combined be possessed of the requisite qualities of durability associated with the ether resins.

A further objective is to provide a novel unmodified ether resin which will when combined (as indicated above) with urea or melamine resins bake out or cure at 300 degrees F. to provide a flexible thoroughly cured film.

Still another object of the invention is to provide a novel ether resin capable of later modification by total or partial esterification with solvent soluble organic acids to produce a novel class of modified ether resins useful in the protective coatings art inherently improved by the process of manufacture of the base ether resin as herein described.

The invention is specifically illustrated by the condensation of p-p′ isopropylidene diphenol and epichlorohydrin. Other dihydric phenols may also be employed and species within the genus useful for the purposes of this invention include but are not limited to the following members of the class, e. g., resorcinol, catechol, hydroquinone; and among the polynuclear phenols which are preferred; p-p′ isopropylidene diphenol, p-p′ dihydroxy diphenol, p-p′ dihydroxydibenzyl, etc. Broadly, one mole of the diphenol is condensed with from 1.10 moles to 1.50 moles of difunctional halohydrin in methyl isobutyl ketone as a common solvent therefor, by or through the addition of from 1.1 to 3.5 moles of caustic to the reaction mass depending upon the halohydrin selected. The temperature of the reaction during the initial condensation preferably should not be allowed to exceed 180 degrees F. While for purposes of description we have referred specifically to the use of epichlorohydrin as the other ether resin-forming reactant, it is clear that other difunctional halohydrins may be used in place of the epichlorohydrin, employing therewith, of course, sufficient additional alkali to react with the additional halogen present. Among the useful difunctional halohydrins are included the epihalohydrins, ethylene dihalohydrins, glycerol dihalohydrins, etc.

After the reaction involving the formation of salt and the formation of the polymer has been completed insofar as convenient in the two-phase system involving an alkaline emulsion, the reaction mass is cooled and acidified with phosphoric acid to a pH of between 6 and 7. Oxalic acid, or other acid of comparable ionic strength, is added to bring the pH to between 4 and 5. The latter acid assists in breaking the emulsion and the separation thereof into a resin-solvent phase and a predominantly water layer.

Upon separation of phases, the water layer is siphoned off. The water-insoluble layer is thereafter repeatedly washed alternately with water and water acidified with phosphoric acid. The principal objective of the repeated washings is to remove the inorganic salt formed during the course of the reaction. The end of the washing cycle is to provide a resin solution of substantial neutrality and free from water-soluble contaminants. Up to this point the procedure is more or less standard and requires no special comment.

The retained washed mass consists of a ketone solution of the resin containing a portion of the wash water which has not been completely removed by decantation.

Following the standard approach, the procedure would be to distill off the water and solvent during which operation the distilland reaches a temperature of from 300 degrees to 525 degrees F. for a sufficient time interval to insure practically complete removal of volatiles present, and all of the water.

The standard resin thus prepared when formulated into an enamel in conjunction with, for example, 15% of an alcohol-modified urea-formaldehyde resin will not cure or bake out at 300 degrees F., and produces a brittle film unsuited for use in the appliance finishing field, for example. If the baked finish is either over-cured or under-cured, the film will be of brittle character. A film can be examined and tested for under-cure by rubbing the resultant enamel with a cloth saturated with methyl isobutyl ketone using a finger pressure. A properly cured film will release no pigment from the enamel to the contact surface of the test cloth. Further, the film will exhibit toughness when properly cured out by baking as shown by impact tests described below.

If, however, prior to the distillation of the solvent and contaminant water, a small amount of an acid-reactive phosphorus-containing compound is added to the water-washed solvent-containing resin a product is obtained which is observably different in its physical behavior during distillation and will, when formulated in an enamel as indicated above, bake out and cure at 300 degrees F. to produce a film having requisite stability, flexibility and toughness.

In the foregoing exposition, a method of manufacture of a resinous product of the ether or polyol type through condensation of a dihydric phenol and a difunctional halohydrin in alkaline media wherein the molar ratio of phenol to halohydrin is within the ratios of 1:1.1 to 1:1.5 and is improved by addition to the resinous condensation subsequent to the removal of water-soluble salts and prior to the final removal of volatiles therefrom by distillation, a catalytic quantity but not more than 1.25% based on the difunctional halohydrin present in the initial resin-forming reaction of an acid reactive phosphorus-containing compound has been indicated.

In order to investigate the scope of useful additives believed to direct the nature of the latter stages of polymerization of the ether-resin, a master batch of material was prepared as above outlined which was carried through the washing stages, but no additive added. One aliquot portion was distilled without any additive material included in the distilland, and a series of other aliquot portions was distilled having present the kind and percentage of additive as shown in Table I which follows.

Additionally, enamels were prepared containing one part by weight of titanium dioxide pigment, 0.85 part of the resin solids obtained after processing of the aliquot portion as indicated, and 0.15 part of a general purpose alcohol-modified urea-formaldehyde resin solids of the class used in enamels for baking purposes.[1]

Flexibility of the films of said enamels was tested by reducing the series of enamels so prepared to spraying viscosity, spraying samples on cold rolled steel panels suitably cleaned with solvent, followed by baking the panels for 30 minutes at 300 degrees F. Each panel was, after cooling to room temperature, subjected to an impact test in a guillotine-like device which delivered the impact of a 16 pound weight falling through a distance of eight inches acting with a force of 128 inch pounds upon a steel ball of ½ inch diameter and, in turn, upon the coated panel under test.

Ratings were assigned to the results of the tests as follows:

Excellent—No failure of the film of enamel either on concave or convex area resulting from intrusion on the one hand or extrusion upon the other hand.

Good—No failure on intrusion-concave test area. Slight indications of hairline cracks upon extrusion convex test area.

Fair—Definite failure upon extrusion-convex test area. None on intrusion-concave test area.

Poor—Failure by cracking of enamel upon both concave and convex test areas.

Table I

| Test No. | Additive Tested | Percent Additive Based on Halohydrin | Flexibility Rating |
|---|---|---|---|
| 1 | H₃PO₄ (85%) | 0.65 | Excellent. |
| 2 | H₃PO₄ (85%) | 2.60 | Poor. |
| 3 | H₃PO₄ (85%) | 1.30 | Fair-Poor. |
| 4 | H₃PO₄ (85%) | 1.25 | Fair. |
| 5 | H₃PO₄ (85%) | 0.10 | Excellent. |
| 6 | H₃PO₄ (85%) | 1.00 | Do. |
| 7 | Acetic Acid | 0.65 | Poor. |
| 8 | Oxalic Acid | 0.65 | Do. |
| 9 | Sulfuric Acid | 0.65 | Black and useless for enamel. |
| 10 | p-Toluene sulfonic acid | 0.65 | Unstable on age. |
| 11 | Mono octyl di-acid phosphate | 0.65 | Excellent. |
| 12 | Di-octyl mono-acid phosphate. | 0.65 | Do. |
| 13 | Tributyl phosphate | 0.65 | Poor. |
| 14 | Urea acid phosphate | 0.65 | Excellent. |
| 15 | Mono phenyl phosphinic acid. | 0.65 | Do. |
| 16 | Mono phenyl phosphoric acid. | 0.65 | Do. |

From the tabulated test results it is clear that the addition of an acid-reactive phosphorus-containing compound, and particularly the acids and partial organic alcohol esters of phosphoric acids to the alkaline condensation product of a dihydric phenol and a difunctional halohydrin prior to the distillation of volatiles therefrom, but subsequent to the removal of water-soluble salts has a marked effect upon the nature of the

---

[1] A butylated urea-formaldehyde resin solution in a xylol butanol solvent containing 50% of solids, described by Plaskon Division of Libbey-Owens-Ford in a booklet entitled "Plaskon for Paints, Varnishes and Lacquers," 1948.

polymer obtained, particularly in relation to its flexibility when combined with harder, more brittle resins for baking purposes.

It will be noted in the above table that acidic materials other than phosphorus-containing were not successful in producing the desired end. Oxalic acid (8) gave poor flexibility and p-toluene sulfonic acid (10) samples were unstable upon age after formulation. The acids and the partial esters of the acids of phosphorus are particularly suitable for the purposes of the invention.

The use of more than 1.25% of active phosphorus- or phosphoric acid-containing compound based on the halohydrin content of the reaction mass interferes seriously with the qualities of the product, and the desired flexibility is lost.

The lower limits appear to be less critical, for excellent results have been obtained with as low as 0.10% of $H_3PO_4$ as shown in test Number 5. Exploratory results were obtained on other additives at a 0.65% level to determine the scope of the invention. Test Number 13 illustrates that something more than the phosphate group is essential. The excellent quality of the resin obtained in tests numbered 11, 12, 14, 15 and 16 indicate that the presence of an acid-reactive phosphorus-containing compound is essential to the flexibility of the resultant resin, and that the particular valency of the phosphorus atom in the molecule is not critical.

Other phosphorus acid-containing compounds useful for the purposes of polymerization control as herein described include the following as specific examples:

1. Monolauryl phosphoric acid
2. Dilauryl phosphoric acid
3. Monodiphenyl phosphoric acid
4. Diphenyl phosphorus acid
5. Diphenyl phosphoric acid
6. Diphenyl pyro phosphoric acid
7. Metaphosphoric acid
8. Metaphosphorus acid
9. Mono, di-, and tri esters of:
   pyro phosphoric acid
   pyro phosphorus acid
10. Monoesters of hypophosphoric acid
11. Monotolyl phosphoric acid
12. Dinapthyl phosphoric acid
13. Dibutyl phosphoric acid
14. Dioctyl phosphoric acid
15. Sodium phenyl phosphoric acid
16. Monoethyl phosphite
17. Diethyl phosphite
18. Dilauryl thio phosphorus acid
19. Dilauryl thio phosphoric acid
20. Phenyl thio phosphite
21. Dibutyl ester of tetra thio phosphoric acid Erratic results have been obtained in attempts to leave in minute traces of compounds containing an acid of phosphorus by failure to wash the resin free of contaminants. In order to control the process, it has been found preferable to remove all the water-soluble impurities by repeated washings and prior to distillation of the volatiles from the resin layer to add a measured portion of the acid-reactive phosphorus-containing compound to the resinous distilland.

Addition of the acid-reactive phosphorus compound may be made after the distillation, but superior results are obtained and it is preferred that the additive be cooked into the resin by the distillation procedure. Such technique favors greater stability of the resin when later compounded into a variety of protective coating formulations and is believed to assist in the increase in length of the linear polymer chains. It is believed from the behavior of the resultant resinous product that the additive acts as a polymerization modifier and apparently encourages the formation of longer linear polymers than are otherwise obtained in the absence of the defined additive. The polymeric chains formed are believed to have the following general structure:

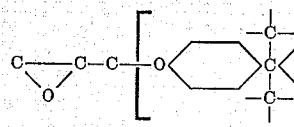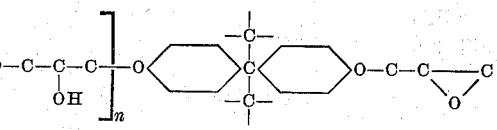

wherein $n$ is of greater value than is the case wherein the acid-reactive phosphorus-containing compound is not present during the final heating stage.

The following examples specifically illustrate the practice of the invention and the means whereby the data tabulated priorly were obtained. The theory and the examples herein shall not be construed as limiting but are set forth only as explanation and illustration of the advance in the art claimed.

*Example I*

Into a five liter flask equipped with mechanical stirrer, reflux condenser thermometer and dropping funnel weigh:

1373 parts water
185 parts sodium hydroxide
818 parts p-p' isopropylidene diphenol Start to heat. Gain 150 degrees F., in about one hour. Add the following solution:

208 parts epichlorohydrin
83 parts methyl isobutyl ketone slowly over a half-hour period. The reaction is exothermic. Additional alkali as follows is added:

60 parts caustic
83 parts water

Reflux is thereafter continued for one hour, and 208 parts additional epichlorohydrin added slowly at such rate as to maintain reflux. During addition of the latter portion of an epichlorohydrin, the reaction mass becomes increasingly viscous.

Add 884 parts of methyl isobutyl ketone to reduce the viscosity and provide easier stirring during an additional one and a half hours of reflux. Cool the reaction mixture and acidify with 85% $H_3PO_4$ to a pH of 6–7. Reduce the pH further to from 4 to 5 by addition of oxalic acid. Stirring is discontinued and the broken emulsion allowed to separate into a water layer and an organic layer. Siphon off the water layer. Wash the organic layer alternately with 1500 parts of water and 1500 parts of water very slightly acidified with phosphoric acid. The alternative use of acid in the wash-water inhibits re-emulsification and assists clean phase separation of the wash-water layer from the washed resin layer. Wash finally with clear water alone to provide a resin free from water-soluble salts and of essentially neutral nature.

After the last wash add 2.7 parts of 85% $H_3PO_4$ (0.65% based on epichlorohydrin content). Distill the resinous mass to remove the volatile material present. Upon the distilland reaching a temperature of 240 degrees F., all of the water has been removed and the product is transparent. Distillation is continued until essentially all of the solvent is removed. At this point the distilland reaches a temperature of about 325 degrees F.

The resin is allowed to cool, and is cut or thinned with the addition of:

633.5 parts toluene
542.0 parts Cellosolve Acetate to provide a vehicle having the following characteristics.

50% solids
Viscosity Z-1 (Gardner)
Color -7-

*Example II*

(Preparation of test enamels)

2200 parts of enamel grade titanium dioxide pigment
540 parts Plaskon 3300 [1]

are weighed into a Baker-Perkins dough mixer and ground for 30 minutes to produce a dispersion of 7-H (Hegman gauge).

90 parts of urea-formaldehyde resin [1]
315 parts solvent blend [2]

are added and thoroughly incorporated into the paste in the dough mixer. The base is removed from the mill and further compounded as follows:

430 parts base paste (above)
4 parts urea-formaldehyde resin [1]
566 parts varnish resin of Example I The finished enamel is further reduced one part enamel to one part solvent blend [2] for spray application.

The improvement in the polymer has been illustrated by combination with aminoplast resin, for the modification made in the ether resin can more readily be demonstrated by this means. However, the change in the nature of the polymer is not dependent upon the illustrative combination, and differences in the nature of the polymer are apparent to one who prepares the described class of resinous material with and without the additive modifier by comparison of differences in behavior of the reaction mass as during the cooking thereof.

Having described an improved class of ether resin products and the method for their manufacture, we claim:

1. In the manufacture of a resinous product of the ether type by condensation of a dihydric phenol and a difunctional halohydrin in alkaline media wherein the molar ratio of said phenol to said halohydrin is within the ratios of 1:1.1 to 1:1.5, the improvement which comprises adding to the resinous phase subsequent to the removal of water-soluble salts and prior to the final removal of volatiles therefrom by distillation, a catalytic quantity but not more than 1.25% based on the halohydrin content of said resin forming constituents of an acid-reactive phosphorus-containing compound exclusive of the inorganic salts of phosphorus.

2. In the manufacture of a resinous product of the ether type by condensation of a dihydric phenol with epichlorohydrin in alkaline media wherein the molar ratio of said phenol to epichlorohydrin is within the ratios of 1:1.1 to 1:1.5, the improvement which comprises adding to the resinous phase subsequent to the removal of water-soluble salts and prior to the final removal of volatiles therefrom by distillation, a catalytic quantity but not more than 1.25% based on the epichlorohydrin content of said resin forming constituents of an acid-reactive phosphorus-containing compound exclusive of the inorganic salts of phosphorus.

3. In the manufacture of a resinous product of the ether type by condensation of a dihydric phenol and a difunctional halohydrin in alkaline media wherein the molar ratio of said phenol to said halohydrin is within the ratios of from 1:1.3 to 1:1.2, the improvement which comprises adding to the resinous phase subsequent to the removal of water-soluble salts and prior to the final removal of volatiles therefrom by distillation, a catalytic quantity but not more than 1.25% based on the halohydrin content of said resin forming constituents of an acid-reactive phosphorus-containing compound exclusive of the inorganic salts of phosphorus.

4. In the manufacture of a resinous product of the ether type by condensation of a dihydric phenol and a difunctional halohydrin in alkaline media wherein the molar ratio of phenol to halohydrin is within the ratios of from 1:1.1 to 1:1.5, the improvement which comprises adding to the resinous phase subsequent to the removal of water-soluble salts and prior to the final removal of volatiles therefrom by distillation from 0.10% to 1.0% based on the halohydrin content of said resin forming constituents of an organic acid-reactive phosphorus-containing compound.

5. In the manufacture of a resinous product of the ether type by condensation of a dihydric phenol and a difunctional chlorohydrin in alkaline media wherein the molar ratio of said phenol to said chlorohydrin is within the ratios of 1:1.1 to 1:1.5, the improvement which comprises adding to the resinous phase subsequent to the removal of water-soluble salts and prior to the final removal of volatiles therefrom by distillation, a catalytic quantity but not more than 1.25% based on the chlorohydrin content of said resin forming constituents of a compound selected from the group consisting of acids and the partial acid esters of the acids of phosphorus.

6. In the manufacture of a resinous product of the ether type by condensation of p-p' isopropylidene diphenol with epichlorohydrin in an alkaline media wherein the molar ratio of said phenol to epichlorohydrin is within the ratios of from 1:1.3 to 1:1.2, the improvement which comprises adding to the resinous phase subsequent to the removal of water-soluble salts and prior to the final removal of volatiles therefrom by distillation from 0.10% to 1.0% based on the epichlorohydrin content of said resin forming constituents of a phosphorus acid containing compound selected from the group consisting of the acids and the partial esters of the acids of phosphorus.

7. In the manufacture of a resinous product of the ether type by condensation of p-p' isopropylidene diphenol with epichlorohydrin in alkaline

[1] See footnote in column 4.
[2] Solvent blend contains: 50% toluene, 42.8% Cellosolve Acetate, 7.2% methyl isobutyl ketone.

media wherein the molar ratio of said phenol to epichlorohydrin is within the ratios of from 1:1.3 to 1:1.2, the improvement which comprises adding to the resinous phase subsequent to the removal of water-soluble salts and prior to the final removal of volatiles therefrom by distillation from 0.10% to 1.0% based on the epichlorohydrin content of said resin forming constituents of a compound selected from the group consisting of the acids and the partial esters of the acids of phosphorus.

References Cited in the file of this patent

UNITED STATES PATENTS

| Number | Name | Date |
|---|---|---|
| 2,512,996 | Bixler | June 27, 1950 |
| 2,528,934 | Wiles | Nov. 7, 1950 |
| 2,541,027 | Bradley | Feb. 13, 1951 |